United States Patent
Sun et al.

(10) Patent No.: US 10,451,325 B2
(45) Date of Patent: Oct. 22, 2019

(54) TRANSCRITICAL REFRIGERANT VAPOR COMPRESSION SYSTEM HIGH SIDE PRESSURE CONTROL

(71) Applicant: Carrier Corporation, Farmington, CT (US)

(72) Inventors: Jian Sun, Fayetteville, NY (US); Lucy Yi Liu, Fayetteville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 890 days.

(21) Appl. No.: 14/423,254

(22) PCT Filed: Aug. 20, 2013

(86) PCT No.: PCT/US2013/055643
§ 371 (c)(1),
(2) Date: Feb. 23, 2015

(87) PCT Pub. No.: WO2014/031559
PCT Pub. Date: Feb. 27, 2014

(65) Prior Publication Data
US 2015/0219379 A1 Aug. 6, 2015

Related U.S. Application Data

(60) Provisional application No. 61/692,910, filed on Aug. 24, 2012.

(51) Int. Cl.
| F25B 49/02 | (2006.01) |
| F25B 9/00 | (2006.01) |
| F25B 1/10 | (2006.01) |

(52) U.S. Cl.
CPC ............. *F25B 49/022* (2013.01); *F25B 1/10* (2013.01); *F25B 9/008* (2013.01); *F25B 49/02* (2013.01);
(Continued)

(58) Field of Classification Search
CPC .... F25B 49/02; F25B 49/022; F25B 2500/19; F25B 2600/0261; F25B 2600/0253;
(Continued)

(56) References Cited

U.S. PATENT DOCUMENTS

| 2,952,991 A | 9/1960 | St. Pierre |
| 3,415,071 A | 12/1968 | Kompelien |

(Continued)

FOREIGN PATENT DOCUMENTS

| CN | 1573261 A | 2/2005 |
| CN | 1926391 A | 3/2007 |

(Continued)

OTHER PUBLICATIONS

Chinese Office Action for application CN 201380043554.3 dated Oct. 21, 2016, 6 pages.

(Continued)

*Primary Examiner* — Christopher R Zerphey
(74) *Attorney, Agent, or Firm* — Cantor Colburn LLP

(57) ABSTRACT

Operation of a transcritical refrigerant vapor compression system is controlled, when operating in a high capacity mode, through control of the refrigerant pressure in the refrigerant heat rejection heat exchanger (40) or the compressor (30) discharge pressure, also referred to herein as the high side pressure, so as to optimize energy efficiency. When operating in unloaded low capacity mode, such as for chilling perishable product during temperature maintenance operation, the high side pressure is controlled so that the system can operate in a continuous running mode.

20 Claims, 3 Drawing Sheets

(52) U.S. Cl.
CPC . *F25B 2309/061* (2013.01); *F25B 2341/0662* (2013.01); *F25B 2400/23* (2013.01); *F25B 2500/19* (2013.01); *F25B 2600/022* (2013.01); *F25B 2600/0253* (2013.01); *F25B 2600/0261* (2013.01); *F25B 2600/2509* (2013.01); *F25B 2700/1931* (2013.01); *F25B 2700/1933* (2013.01); *F25B 2700/21161* (2013.01); *F25B 2700/21163* (2013.01); *F25B 2700/21171* (2013.01); *F25B 2700/21175* (2013.01); *Y02B 30/741* (2013.01)

(58) Field of Classification Search
CPC ........ F25B 2600/111; F25B 2600/2513; F25B 2700/171
See application file for complete search history.

(56) References Cited

U.S. PATENT DOCUMENTS

| | | | |
|---|---|---|---|
| 3,633,376 A | 1/1972 | Miner | |
| 3,645,107 A | 2/1972 | Quick | |
| 4,420,947 A * | 12/1983 | Yoshino | F24D 11/0264 126/585 |
| 5,115,644 A | 5/1992 | Alsenz | |
| 6,968,708 B2 | 11/2005 | Gopalnarayanan et al. | |
| 7,000,413 B2 | 2/2006 | Chen et al. | |
| 7,246,500 B2 | 7/2007 | Singh et al. | |
| 7,845,183 B2 | 12/2010 | Singh et al. | |
| 8,978,402 B2 * | 3/2015 | Itagaki | F25B 30/02 62/222 |
| 2004/0216477 A1 | 11/2004 | Yamasaki et al. | |
| 2005/0198980 A1* | 9/2005 | Cowell | B60H 1/3205 62/226 |
| 2007/0012052 A1 | 1/2007 | Butler et al. | |
| 2007/0125105 A1 | 6/2007 | Manole | |
| 2010/0175400 A1* | 7/2010 | Kasahara | F25B 1/10 62/225 |
| 2011/0048042 A1 | 3/2011 | Chen et al. | |
| 2011/0083454 A1 | 4/2011 | Kopko et al. | |
| 2011/0138825 A1 | 6/2011 | Chen et al. | |

FOREIGN PATENT DOCUMENTS

| | | |
|---|---|---|
| CN | 1959309 A | 5/2007 |
| CN | 101113834 A | 1/2008 |
| CN | 101512255 A | 8/2009 |
| CN | 101688696 A | 3/2010 |
| CN | 101688700 A | 3/2010 |
| CN | 102027300 A | 4/2011 |
| CN | 102171520 A | 8/2011 |
| CN | 102536823 A | 7/2012 |
| EP | 1884726 A2 | 2/2008 |
| EP | 2175212 A1 | 4/2010 |
| JP | 2005180861 A | 7/2005 |
| WO | 2008130357 A1 | 10/2008 |
| WO | 2009091400 A1 | 7/2009 |
| WO | 2012012493 A2 | 1/2012 |

OTHER PUBLICATIONS

Singapore Written Opinion for application SG 11201501310R, dated Jan. 18, 2015, 6 pgs.
International Search Report for application PCT/US2013/055643 dated Nov. 12, 2013, 6 pages.
Written Opinion for application PCT/US2013/055643, dated Nov. 12, 2013, 6 pages.
Chinese First Office Action and search report for application CN 201380043554.3, dated Apr. 5, 2016, 7 pages.

* cited by examiner

TRANSCRITICAL REFRIGERANT VAPOR COMPRESSION SYSTEM HIGH SIDE PRESSURE CONTROL

BACKGROUND OF THE DISCLOSURE

This disclosure relates generally to refrigerant vapor compression systems and, more particularly, to improving the energy efficiency and/or low cooling capacity operation of a transcritical refrigerant vapor compression system.

Refrigerant vapor compression systems are well known in the art and commonly used for conditioning air to be supplied to a climate controlled comfort zone within a residence, office building, hospital, school, restaurant or other facility. Refrigerant vapor compression systems are also commonly used in refrigerating air supplied to display cases, merchandisers, freezer cabinets, cold rooms or other perishable/frozen product storage area in commercial establishments. Refrigerant vapor compression systems are also commonly used in transport refrigeration systems for refrigerating air supplied to a temperature controlled cargo space of a truck, trailer, container or the like for transporting perishable/frozen items by truck, rail, ship or intermodally.

Refrigerant vapor compression systems used in connection with transport refrigeration systems are generally subject to more stringent operating conditions due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity to rapidly pull down the temperature of product loaded into the cargo space at ambient temperature, but also should operate energy efficiently over the entire load range, including at low cooling capacity when maintaining a stable product temperature during transport.

A typical refrigerant vapor compression system includes a compression device, a refrigerant heat rejection heat exchanger, a refrigerant heat absorption heat exchanger, and an expansion device disposed upstream, with respect to refrigerant flow, of the refrigerant heat absorption heat exchanger and downstream of the refrigerant heat rejection heat exchanger. These basic refrigerant system components are interconnected by refrigerant lines in a closed refrigerant circuit, arranged in accord with known refrigerant vapor compression cycles. It is also known practice to incorporate an economizer into the refrigerant circuit for increasing the capacity and energy efficiency of the refrigerant vapor compression system. For example, a refrigerant-to-refrigerant heat exchanger or a flash tank may be incorporated into the refrigerant circuit as an economizer. The economizer circuit includes a vapor injection line for conveying refrigerant vapor from the economizer into an intermediate pressure stage of the compression process.

Traditionally, most of these refrigerant vapor compression systems have been operated at subcritical refrigerant pressures. Refrigerant vapor compression systems operating in the subcritical range are commonly charged with fluorocarbon refrigerants such as, but not limited to, hydrochlorofluorocarbons (HCFCs), such as R22, and more commonly hydrofluorocarbons (HFCs), such as R134a, R410A, R404A and R407C. However, greater interest is being shown in "natural" refrigerants, such as carbon dioxide, for use in refrigeration systems instead of HFC refrigerants. Because carbon dioxide has a low critical temperature, most refrigerant vapor compression systems charged with carbon dioxide as the refrigerant are designed for operation in the transcritical pressure regime.

In refrigerant vapor compression systems operating in a subcritical cycle, both the refrigerant heat rejection heat exchanger, which functions in a subcritical cycle as a condenser, and the refrigerant heat absorption heat exchanger, which functions as an evaporator, operate at refrigerant temperatures and pressures below the refrigerant's critical point. However, in refrigerant vapor compression systems operating in a transcritical cycle, the refrigerant heat rejection heat exchanger operates at a refrigerant temperature and pressure in excess of the refrigerant's critical point, i.e. in the supercritical range, while the refrigerant heat absorption heat exchanger, i.e. the evaporator, operates at a refrigerant temperature and pressure below the refrigerant's critical point, that is in the subcritical range.

Operating at refrigerant pressure and refrigerant temperature in excess of the refrigerant's critical point, the refrigerant heat rejection heat exchanger functions as a gas cooler rather than as a condenser. Thus, the refrigerant leaving the refrigerant heat rejection heat exchanger is still in the vapor (gas) state and at a supercritical pressure. The higher refrigerant pressures associated with operation in a transcritical refrigeration cycle, such as in refrigerant vapor compression systems using carbon dioxide as the refrigerant, complicates operation of the refrigerant vapor compression system. Controlling the high-side pressure, that is the compressor discharge pressure, is not only more difficult, but also more important. For example, a 100 psi departure in compressor discharge pressure from the optimum set point discharge pressure for energy efficiency will result in a significant reduction in energy efficiency. U.S. patent application Ser. No. 13/121,824, assigned to the common assignee as this application is subject to assignment, and filed as the national stage application of International Patent Application No. PCT/2009/058543, filed 28 Sep. 2009, and published as International Publication No. WO 2010/039630, on 8 Apr. 2010, discloses a high-side pressure control for a transcritical refrigeration system, the entire disclosure of which is incorporated herein by reference.

SUMMARY OF THE DISCLOSURE

Operation of a transcritical refrigerant vapor compression system is controlled, when operating in a loaded mode, through control of the refrigerant pressure in the refrigerant heat rejection heat exchanger, also referred to herein as the high side pressure, so as to optimize energy efficiency. When operating in an unloaded mode, such as for chilling perishable product during temperature maintenance operation, the high side pressure is controlled so that the system can operate in a continuous running mode in order to maintain temperature within the temperature controlled space within a required tolerance of a set point temperature.

A refrigerant vapor compression system is disclosed that includes a compression device for compressing a refrigerant vapor from a suction pressure to a discharge pressure, a refrigerant heat rejection heat exchanger and a refrigerant heat absorption heat exchanger arranged in serial refrigerant flow relationship in a transcritical cycle closed-loop primary refrigerant circuit, the refrigerant heat rejection heat exchanger functioning as a refrigerant gas cooler and the refrigerant heat absorption heat exchanger functioning as a refrigerant evaporator, and a controller operatively associated with the refrigerant vapor compression system. In an aspect, the controller is configured to control the discharge pressure to a desired set point discharge pressure to substantially optimize energy efficiency, wherein the controller determines the set point discharge pressure using executable program instructions that execute in the controller to calculate the set point discharge pressure as a function of a sensed refrigerant gas cooler outlet condition, a sensed evaporator outlet refrigerant condition, and a sensed operating speed of the compression device. In an embodiment, the sensed evaporator outlet refrigerant condition may be a sensed suction pressure.

The refrigerant vapor compression system may also include a flash tank disposed in the primary refrigerant circuit in serial refrigerant flow relationship between the refrigerant heat rejection heat exchanger and the refrigerant heat absorption heat exchanger, an economizer vapor line fluidly interconnecting the flash tank to an intermediate pressure stage of the compression device, a high pressure expansion device disposed in the primary refrigerant circuit between the refrigerant heat rejection heat exchanger and the flash tank, and an evaporator expansion device disposed in the primary refrigerant circuit between the flash tank and the refrigerant heat absorption heat exchanger. The controller may be further configured to adjust a degree of openness of the high pressure expansion device to control the discharge pressure to a set point discharge pressure that varies in real-time in response to selected operating parameters to substantially optimize energy efficiency.

The refrigerant vapor compression system may also further include an unload circuit including a unload refrigerant line fluidly connecting an intermediate pressure stage of the compression device to a low-pressure side of the primary refrigerant circuit and an unload flow control device disposed in the unload refrigerant line, the unload flow control device selectively positionable in at least one open position wherein refrigerant may flow through the unload refrigerant line and a closed position wherein refrigerant is blocked from flowing through the unload refrigerant line. The controller may be further configured to control discharge pressure when the unload flow control device is in the open position by varying a duty cycle or a speed of a fan operatively associated with the refrigerant heat rejection heat exchanger.

In an aspect, a method is provided for optimizing energy efficiency of a refrigeration system of a transport refrigeration unit for supplying refrigerated air to a cargo storage box for storing product for transportation under perishable or frozen conditions. The method includes: compressing a refrigerant in a compression device to a discharge pressure in excess of a critical point for the refrigerant; passing the compressed refrigerant substantially at the discharge pressure through a refrigerant gas cooler; expanding the refrigerant discharged from the refrigerant vapor cooler to an intermediate pressure less than the critical point of the refrigerant; passing the expanded refrigerant into a flash tank to separate into a refrigerant vapor and a refrigerant liquid; further expanding at least a portion of the refrigerant liquid; passing the further expanded refrigerant through an evaporator heat exchanger in heat exchange relationship with air to be supplied to the cargo storage box; operating the refrigerant vapor compression system in one of a capacity mode and an unload mode; and when operating in a capacity mode, controlling the discharge pressure to a desired set point discharge pressure to substantially optimize energy efficiency, wherein executable program instructions that execute in the controller determines the set point discharge pressure as a function of a sensed refrigerant gas cooler outlet condition, a sensed evaporator outlet refrigerant condition, and a sensed operating speed of the compression device. In an embodiment, the sensed evaporator outlet refrigerant condition may be a sensed suction pressure.

In an embodiment of the system and the method, executable program instructions that execute in the controller calculate the set point discharge pressure according to the function:

$$P_{DISopt} = f(R_{GCOUT}, R_{EVAP}) \times (\text{compressor speed factor}),$$
wherein:

$P_{DISopt}$ is the optimal set point discharge pressure,
$R_{GCout}$ is a gas cooler outlet refrigerant condition,
$R_{EvAPout}$ is the evaporator outlet refrigerant condition.

The compressor speed correction factor may be a function of the compressor speed in revolutions per minute, f(rpm). In an embodiment, the compressor speed correction factor may be a non-linear function of the compressor speed in revolutions per minute. In an embodiment, the compressor speed correction factor is a quadratic function of the operating speed of the compression device in revolutions per minute.

The method may further include expanding the refrigerant discharged from the refrigerant gas cooler to an intermediate pressure less than the critical point of the refrigerant comprises passing the refrigerant discharged from the refrigerant gas cooler through a high pressure expansion device; and controlling the discharge pressure to a desired set point discharge pressure to substantially optimize energy efficiency further includes adjusting a degree of openness through the high pressure expansion device in response to a differential between a sensed discharge pressure and the set point discharge pressure. When the system is operating in an unload mode, the method may include controlling the discharge pressure to maintain the refrigeration vapor compression system operating to a continuous running mode at minimal cooling capacity by varying a duty cycle or a speed of a fan operatively associated with the refrigerant gas cooler.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
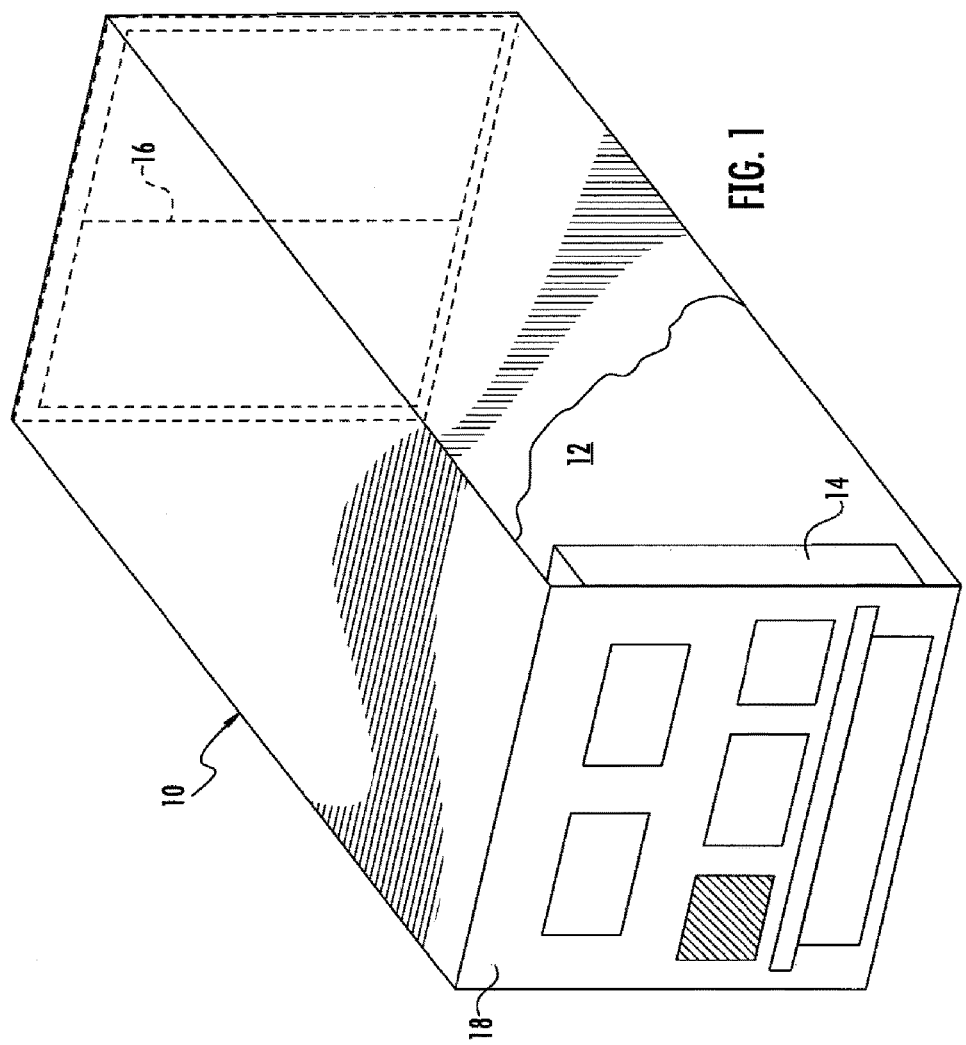
FIG. 1 is perspective view of a refrigerated container equipped with a transport refrigeration unit.

There is depicted in FIG. 1 an exemplary embodiment of a refrigerated container 10 having a temperature controlled cargo space 12 the atmosphere of which is refrigerated by operation of a transport refrigeration unit 14 associated with the cargo space 12. In the depicted embodiment of the refrigerated container 10, the transport refrigeration unit 14 is mounted in a wall of the refrigerated container 10, typically in the front wall 18 in conventional practice. However, the refrigeration unit 14 may be mounted in the roof, floor or other walls of the refrigerated container 10. Additionally, the refrigerated container 10 has at least one access door 16 through which perishable goods, such as, for example, fresh or frozen food products, may be loaded into and removed from the cargo space 12 of the refrigerated container 10.

Figure 2:
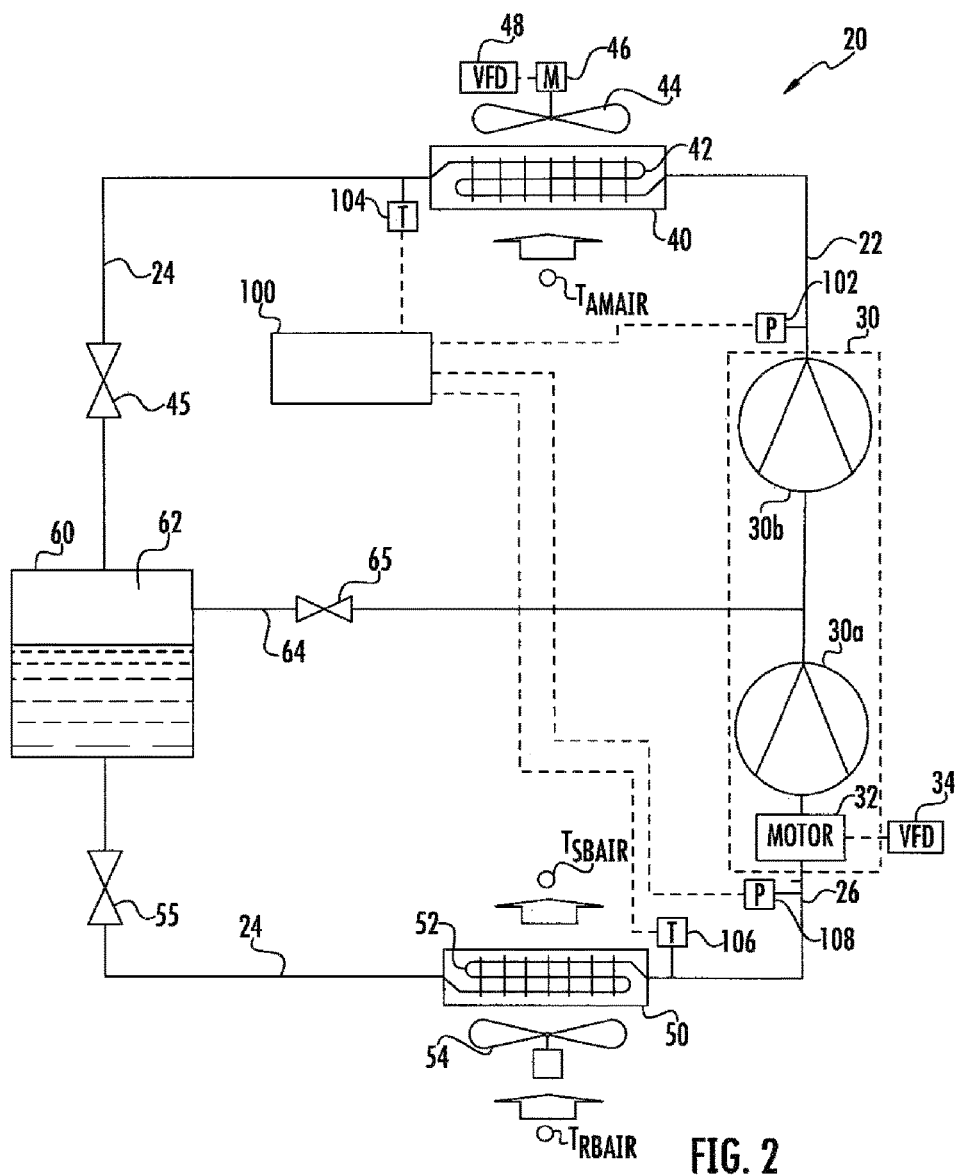
FIG. 2 is a schematic illustration of an embodiment of the refrigerant vapor compression system of the transport refrigeration unit that may be operated in accord with the method disclosed herein.

Referring now to FIG. 2, there is depicted schematically an embodiment of a refrigerant vapor compression system 20 suitable for use in the transport refrigeration unit 14 for refrigerating air drawn from and supplied back to the temperature controlled cargo space 12. Although the refrigerant vapor compression system 20 will be described herein in connection with a refrigerated container 10 of the type commonly used for transporting perishable goods by ship, by rail, by land or intermodally, it is to be understood that the refrigerant vapor compression system 20 may also be used in transport refrigeration units for refrigerating the cargo space of a truck, a trailer or the like for transporting perishable fresh or frozen goods. The refrigerant vapor compression system 20 is also suitable for use in conditioning air to be supplied to a climate controlled comfort zone within a residence, office building, hospital, school, restaurant or other facility. The refrigerant vapor compression system 20 could also be employed in refrigerating air supplied to display cases, merchandisers, freezer cabinets, cold rooms or other perishable and frozen product storage areas in commercial establishments.

The refrigerant vapor compression system 20 includes a multi-stage compression device 30, a refrigerant heat rejection heat exchanger 40, a flash tank 60, and a refrigerant heat absorption heat exchanger 50, also referred to herein as an evaporator, with refrigerant lines 22, 24 and 26 connecting the aforementioned components in serial refrigerant flow order in a primary refrigerant circuit. A high pressure expansion device (HPXV) 45, such as for example an electronic expansion valve, is disposed in refrigerant line 24 upstream of the flash tank 60 and downstream of refrigerant heat rejection heat exchanger 40. An evaporator expansion device (EVXV) 55, such as for example an electronic expansion valve, operatively associated with the evaporator 50, is disposed in refrigerant line 24 downstream of the flash tank 60 and upstream of the evaporator 50.

The compression device 30 functions to compress the refrigerant and to circulate refrigerant through the primary refrigerant circuit as will be discussed in further detail hereinafter. The compression device 30 may comprise a single, multiple-stage refrigerant compressor, for example a reciprocating compressor or a scroll compressor, having a first compression stage 30a and a second stage 30b, wherein the refrigerant discharging from the first compression stage 30a passes to the second compression stage 30b for further compression. Alternatively, the compression device 30 may comprise a pair of individual compressors, one of which constitutes the first compression stage 30a and other of which constitutes the second compression stage 30b, connected in series refrigerant flow relationship in the primary refrigerant circuit via a refrigerant line connecting the discharge outlet port of the compressor constituting the first compression stage 30a in refrigerant flow communication with the suction inlet port of the compressor constituting the second compression stage 30b for further compression. In a two compressor embodiment, the compressors may be scroll compressors, screw compressors, reciprocating compressors, rotary compressors or any other type of compressor or a combination of any such compressors. In both embodiments, in the first compression stage 30a, the refrigerant vapor is compressed from a lower pressure to an intermediate pressure and in the second compression stage 30b, the refrigerant vapor is compressed from an intermediate pressure to higher pressure.

In the embodiment of the refrigerant vapor compression system 20 depicted in FIG. 2, the compression device 30 is driven by a variable speed motor 32 powered by electric current delivered through a variable frequency drive 34. The electric current may be supplied to the variable speed drive 34 from an external power source (not shown), such as for example a ship board power plant, or from a fuel-powered engine drawn generator unit, such as a diesel engine driven generator set, attached to the front of the container. The speed of the variable speed compressor 30 may be varied by varying the frequency of the current output by the variable frequency drive 34 to the compressor drive motor 32. It is to be understood, however, that the compression device 30 could in other embodiments comprise a fixed speed compressor.

The refrigerant heat rejection heat exchanger 40 may comprise a finned tube heat exchanger 42 through which hot, high pressure refrigerant discharged from the second compression stage 30b (i.e. the final compression charge) passes in heat exchange relationship with a secondary fluid, most commonly ambient air drawn through the heat exchanger 42 by the fan(s) 44. The finned tube heat exchanger 42 may comprise, for example, a fin and round tube heat exchange coil or a fin and flat mini-channel tube heat exchanger. In the depicted embodiment, a variable speed motor 46 powered by a variable frequency drive 48 drives the fan(s) 44 associated with the heat rejection heat exchanger 40.

When the refrigerant vapor compression system 20 operates in a transcritical cycle, the pressure of the refrigerant discharging from the second compression stage 30b and passing through the refrigerant heat rejection heat exchanger 40, referred to herein as the high side pressure, exceeds the critical point of the refrigerant, and the refrigerant heat rejection heat exchanger 40 functions as a gas cooler. However, it should be understood that if the refrigerant vapor compression system 20 operates solely in the subcritical cycle, the pressure of the refrigerant discharging from the compressor and passing through the refrigerant heat rejection heat exchanger 40 is below the critical point of the refrigerant, and the refrigerant heat rejection heat exchanger 40 functions as a condenser. As the method of operation disclosed herein pertains to operation of the refrigerant vapor compression system 20 in a transcritical cycle, the refrigerant heat rejection heat exchanger will also be referred to herein as gas cooler 40.

The refrigerant heat absorption heat exchanger 50 may also comprise a finned tube coil heat exchanger 52, such as a fin and round tube heat exchanger or a fin and flat, mini-channel tube heat exchanger. Whether the refrigerant vapor compression system is operating in a transcritical cycle or a subcritical cycle, the refrigerant heat absorption heat exchanger 50 functions as a refrigerant evaporator. Before entering the evaporator 50, the refrigerant passing through refrigerant line 24 traverses the evaporator expansion device 55, such as, for example, an electronic expansion valve or a thermostatic expansion valve, and expands to a lower pressure and a lower temperature to enter heat exchanger 52. As the liquid refrigerant traverses the heat exchanger 52, the liquid refrigerant passes in heat exchange relationship with a heating fluid whereby the liquid refrigerant is evaporated and typically superheated to a desired degree. The low pressure vapor refrigerant leaving heat exchanger 52 passes through refrigerant line 26 to the suction inlet of the first compression stage 30a. The heating fluid may be air drawn by an associated fan(s) 54 from a climate controlled environment, such as a perishable/frozen cargo storage zone associated with a transport refrigeration unit, or a food display or storage area of a commercial establishment, or a building comfort zone associated with an air conditioning system, to be cooled, and generally also dehumidified, and thence returned to a climate controlled environment.

The flash tank 60, which is disposed in refrigerant line 24 between the gas cooler 40 and the evaporator 50, upstream of the evaporator expansion valve 55 and downstream of the high pressure expansion device 45, functions as an economizer and a receiver. The flash tank 60 defines a chamber 62 into which expanded refrigerant having traversed the high pressure expansion device 45 enters and separates into a liquid refrigerant portion and a vapor refrigerant portion. The liquid refrigerant collects in the chamber 62 and is metered therefrom through the downstream leg of refrigerant line 24 by the evaporator expansion device 55 to flow through the evaporator 50.

The vapor refrigerant collects in the chamber 62 above the liquid refrigerant and may pass therefrom through economizer vapor line 64 for injection of refrigerant vapor into an intermediate stage of the compression process. An economizer flow control device 65, such as, for example, a solenoid valve (ESV) having an open position and a closed position, is interposed in the economizer vapor line 64. When the refrigerant vapor compression system 20 is operating in an economized mode, the economizer flow control device 65 is opened thereby allowing refrigerant vapor to pass through the economizer vapor line 64 from the flash tank 60 into an intermediate stage of the compression process. When the refrigerant vapor compression system 20 is operating in a standard, non-economized mode, the economizer flow control device 65 is closed thereby preventing refrigerant vapor to pass through the economizer vapor line 64 from the flash tank 60 into an intermediate stage of the compression process.

In an embodiment where the compression device 30 has two compressors connected in serial flow relationship by a refrigerant line, one being a first compression stage 30a and the other being a second compression stage 30b, the vapor injection line 64 communicates with refrigerant line interconnecting the outlet of the first compression stage 30a to the inlet of the second compression stage 30b. In an embodiment where the compression device 30 comprises a single compressor having a first compression stage 30a feeding a second compression stage 30b, the refrigerant vapor injection line 64 can open directly into an intermediate stage of the compression process through a dedicated port opening into the compression chamber.

The refrigerant vapor compression system 20 also includes a controller 100 operatively associated with the plurality of flow control devices 45, 55 and 65 interdisposed in various refrigerant lines as previously described. As in conventional practice, in addition to monitoring ambient air temperature, $T_{AMAIR}$, supply box air, $T_{SBAIR}$, and return box air, $T_{RBAIR}$, the controller 100 also monitors various pressures and temperatures and operating parameters by means of various sensors operatively associated with the controller 100 and disposed at selected locations throughout the refrigerant vapor compression system 20. In the embodiment of the refrigerant vapor compression system 20 depicted in FIG. 2, a pressure sensor 102 may be disposed in association with the compression device 30, $P_{DIS}$, or may be disposed in association with the gas cooler 40 to sense the pressure of the refrigerant at the outlet of the heat exchanger coil 42 of the gas cooler 40, which pressure is equivalent to $P_{DIS}$; a temperature sensor 104 may be disposed in association with the gas cooler 40 to measure the temperature of the refrigerant leaving the heat exchange coil 42 of the gas cooler 40, $T_{GCout}$; a temperature sensor 106 may be disposed in association with the evaporator 50 to sense the temperature of the refrigerant leaving the heat exchange coil 52 of the evaporator 50, $T_{EVAPout}$; and a pressure sensor 108 may be disposed in association with the suction inlet of the first compression stage 30a to sense the pressure of the refrigerant feeding to the first compression stage 30a, $P_{SUCT}$. The pressure sensors 102 and 108 may be conventional pressure sensors, such as for example, pressure transducers, and the temperature sensors 104 and 106 may be conventional temperature sensors, such as for example, thermocouples or thermistors.

The term "controller" as used herein refers to any method or system for controlling and should be understood to encompass microprocessors, microcontrollers, programmed digital signal processors, integrated circuits, computer hardware, computer software, electrical circuits, application specific integrated circuits, programmable logic devices, programmable gate arrays, programmable array logic, personal computers, chips, and any other combination of discrete analog, digital, or programmable components, or other devices capable of providing processing functions.

The controller 100 is configured to control operation of the refrigerant vapor compression system in various operational modes, including several capacity modes. A capacity mode is a system operating mode wherein a refrigeration load is imposed on the system requiring the compressor to run in a loaded condition to meet the cooling demand. In an unloaded mode, the cooling demand imposed upon the system is so low that sufficient cooling capacity may be generated to meet the cooling demand with the compressor running in an unloaded condition. The controller 100 is also configured to control the variable speed drive 34 to vary the frequency of electric current delivered to the compressor drive motor so as to vary the speed of the compression device 30 in response to capacity demand.

As noted previously, in transport refrigeration applicants, the refrigerant vapor compression system 20 must be capable of operating at high capacity to rapidly pulldown the temperature within the cargo box upon loading and must be capable of operating at extremely low capacity during maintenance of the box temperature within a very narrow band, such as for example as little as +/−0.25° C. (+/−0.45° F.), during transport. Depending upon the particular cargo being shipped, the required box air temperature may range from as low as −34.4° C. (−30° F.) up to 30° C. (86° F.). Thus, the controller 100 will selectively operate the refrigerant vapor compression system in response to a cooling capacity demand, such as during initial pulldown and recovery pulldowns, in an economized perishable mode or a standard non-economized perishable mode for non-frozen perishable products, and in an economized frozen mode or a standard non-economized frozen mode for frozen products.

The controller 100 may also selectively operate the refrigerant vapor compression system 20 in an unload mode when maintaining the box temperature in a narrow band around a set point box temperature. Typically, the box temperature is controlled indirectly through monitoring and set point control of one or both of the temperature, $T_{SBAIR}$, of the supply box air, i.e. the air leaving the refrigerant heat rejection heat exchanger, i.e. the evaporator 50, and the temperature, $T_{RBAIR}$, of the return box air, i.e. the box air entering the refrigerant heat rejection heat exchanger 50.

The controller 100 is configured to control the compressor discharge pressure to a desired set point discharge pressure, $P_{DISopt}$, to substantially optimize energy efficiency when the refrigerant vapor compression system is operating in any of the afore-mentioned capacity modes. In an embodiment, the controller 100, using executable program instructions in the controller, determines the set point discharge pressure, $P_{DISopt}$ as the product of a compressor speed correction factor and a function of at least a gas cooler outlet refrigerant condition, $R_{GCout}$, and an evaporator refrigerant condition, $R_{EVAP}$, that is:

$$P_{DISopt} = f(R_{GCout}, R_{EVAP}) \times (\text{compressor speed factor}).$$

In an embodiment, the gas cooler outlet refrigerant condition comprises a sensed refrigerant gas cooler outlet temperature. In an embodiment, the evaporator refrigerant condition comprises an evaporator refrigerant saturation temperature.

Since there is no suction modulation valve or other refrigerant flow control device in refrigerant line 26 communicating the outlet of the heat exchange coil 52 of the evaporator coil 50 with the suction inlet of the compression stage 30a, the refrigerant pressure within the evaporator coil 52 is substantially the same as the refrigerant pressure at the suction inlet to the compression device 30. Because the refrigerant passing through the heat exchange coil 52 of the evaporator 50 is in a subcritical state, that is at a temperature and pressure below the critical point of the refrigerant, the refrigerant saturation temperature correlates with the refrigerant pressure. Therefore, the evaporator refrigerant saturation temperature can be either sensed indirectly by sensing the refrigerant pressure at the evaporator heat exchanger coil 52 or can be sensed indirectly by sensing the compressor suction pressure, which is substantially the same as the evaporator refrigerant pressure.

The compressor speed correction factor may be a function of the compressor speed in revolutions per minute, f(rpm). In an embodiment, the compressor speed correction factor may be a non-linear function of the compressor speed in revolutions per minute, such as for example but not limited to a quadratic function of the compressor speed in revolutions per minute. The rpm speed of the compression device 30 may be directly sensed using conventional techniques for sensing the speed of rotation of the shaft of the compressor itself. The rpm speed of the compression device 30 may also be indirectly sensed by sensing the rpm speed of the rotating shaft of the compressor drive motor 32 or by measuring the frequency of the variable speed drive 34.

The controller 100 is configured to compare the sensed compressor discharge pressure, $P_{DIS}$, to the calculated optimal set point discharge pressure, $P_{DISopt}$, and take appropriate action to alter the operating compressor discharge pressure, i.e. the sensed discharge pressure, to match the optimal set point discharge pressure, $P_{DISopt}$, within a specified set point margin. In the depicted embodiment, the compressed discharge pressure is sensed by a pressure sensor 102 positioned in the vicinity of the discharge outlet from the compression device 30. However, as the refrigerant pressure at the outlet of the refrigerant heat rejection heat exchanger 40, i.e. the gas cooler outlet pressure, is substantially equal to the compressor discharge pressure under normal operating conditions, the compressor discharge pressure could also be sensed using a pressure sensor located at the outlet of the gas cooler heat exchanger 40, for example located in proximity to the temperature sensor 104 that senses the gas cooler outlet refrigerant temperature.

To alter the operating compressor discharge pressure, the controller is configured to adjust the degree of openness of the high pressure expansion device 45. Reducing the degree of openness of the high pressure expansion device 45 will cause the operating compressor discharge pressure to increase. Conversely, increasing the degree of openness of the high pressure expansion device 45 will cause the operating compressor discharge pressure to decrease. Whenever the refrigerant vapor compression system 20 is operating in one of the capacity (loaded) modes, the controller 100 will continually calculate the optimal set point discharge pressure and adjust the degree openness of the high pressure expansion device 45 to match the sensed compressor discharge pressure, $P_{DIS}$, to the calculated optimal set point discharge pressure, $P_{DISopt}$.

The controller 100 may be further configured to control discharge pressure when the refrigerant vapor compression system 20 is operating in a low capacity mode such as when maintaining the box temperature within a narrow range of a set point box temperature. For operation of the refrigerant vapor compression system in a low capacity mode, the high pressure expansion valve 45 is positioned full open, the economizer flow control device 65 is positioned closed, and the evaporator expansion device 55 is open and modulated. Since the high pressure expansion value is full open, the compressor discharge pressure cannot be controlled by modulation of the high pressure expansion valve. Rather, when the system is operating in such a low capacity mode, the controller 100 is configured to control the operating compressor discharge pressure by varying a duty cycle or a speed of a fan(s) 44 operatively associated with the refrigerant heat rejection heat exchanger 40. In an embodiment, the fan(s) are driven by a variable speed fan motor 46 powered by electric current delivered through a dedicated variable frequency drive 48 or through the variable frequency drive 34 associated with the compressor motor 32. In this embodiment, when the refrigerant vapor compression system 20 is operating in unloaded low capacity mode, the controller 100 will vary the output frequency of the variable frequency drive 48 (or variable frequency drive 34) to increase or decrease the speed of the fan motor 46 and the fan 44. If the fan 44 is driven by a fixed constant speed fan motor, the controller 100 will cycle the fan motor 46 on and off to vary the duty cycle of the fan 44 to control the operating compressor discharge pressure.

Figure 3:
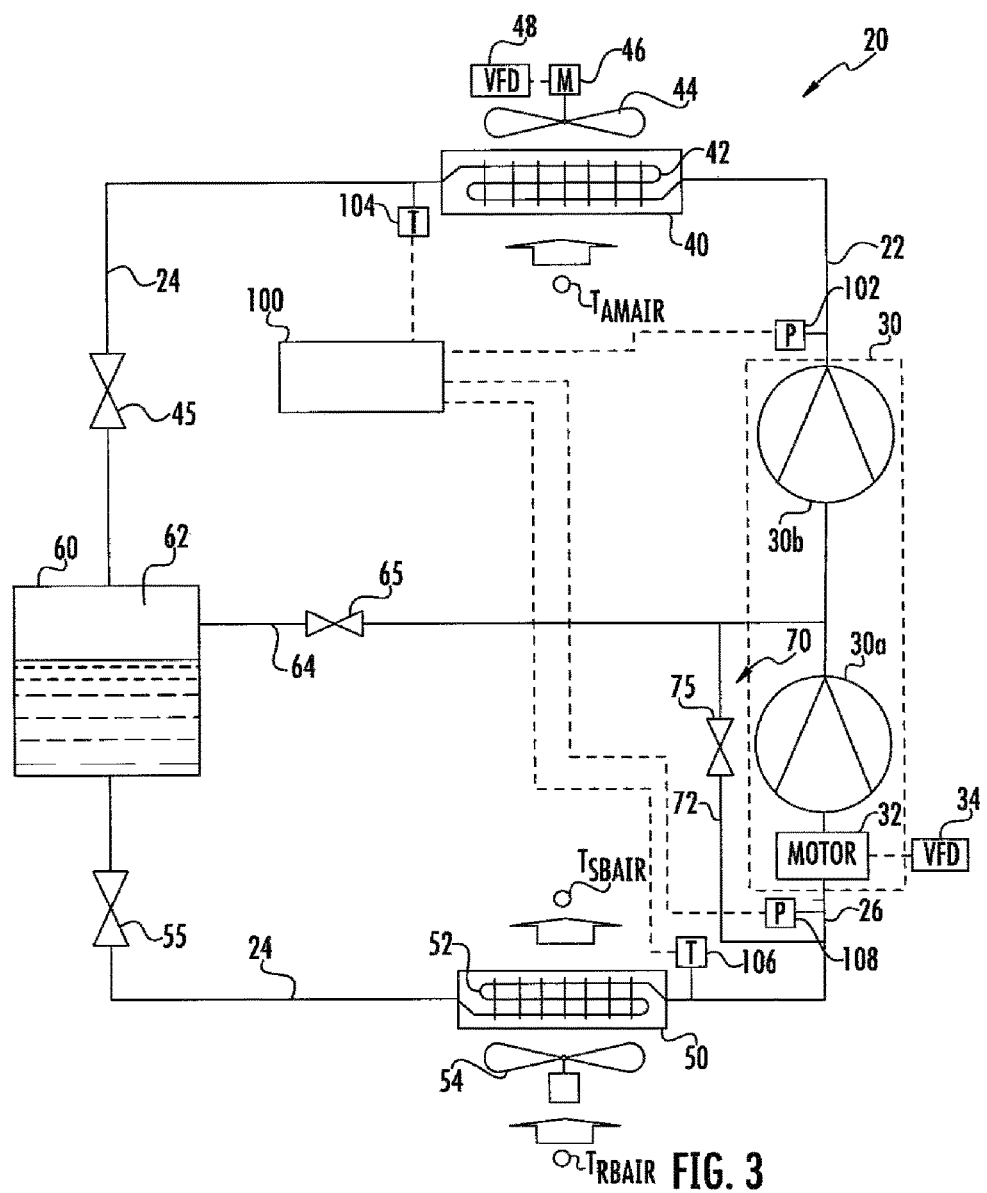
FIG. 3 is a schematic illustration of another embodiment of the refrigerant vapor compression system of the transport refrigeration unit that may be operated in accord with the method disclosed herein.

The refrigerant vapor compression system 20 may further include an compression unload circuit 70 including refrigerant bypass line 72 and an unloader flow control valve 75 interdisposed in refrigerant bypass line 72, for example such as depicted in FIG. 3. Refrigerant bypass line 72 provides a refrigerant flow path from an intermediate pressure stage of the compression process to the low pressure side of the primary refrigerant circuit between the refrigerant outlet of the evaporator heat exchanger coil and the suction inlet of the first compression stage 30a. In the embodiment depicted in FIG. 3, the refrigerant bypass line 72 taps into the vapor injection line 64 at a location downstream of the economizer flow control device 65 and taps into refrigerant line 26 downstream of the evaporator heat exchanger coil 52 and upstream of the suction inlet of the first compression stage 30a.

The unloader flow control valve 75, such as, for example, a solenoid valve (USV) having an open position and a closed position, is closed during operation of the refrigerant vapor compression system 20 in both standard and economized capacity modes and open when the refrigerant vapor compression system is operated in an unloaded mode. When the unloader flow control valve 75 is positioned open, refrigerant vapor passes from an intermediate pressure stage of the compression process to and through the refrigerant bypass line 72 to refrigerant line 26 on the low pressure side of the refrigerant vapor compression system 20. Of course, when the unloader flow control valve 75 is positioned closed, such as when the refrigerant vapor compression system 20 is operating in one of the aforementioned capacity modes, refrigerant is prevented from flowing through refrigerant bypass line 72.

If the refrigerant vapor compression system is equipped with an unloader circuit 70, the controller 100 is configured to open the unloader flow control valve 75 when maintaining the box temperature within a narrow range of a set point box temperature. In the unload mode, the controller 100 is configured as described above within respect to operation of a system shown in FIG. 2, which is not equipped with an unloader, in a low capacity mode to control the operating compressor discharge pressure by varying a duty cycle or a speed of a fan(s) 44 operatively associated with the refrigerant heat rejection heat exchanger 40.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. For example, in either of the depicted embodiments, the refrigerant vapor compression system 20 may further include an intercooler heat exchanger (not shown) disposed in the primary refrigerant circuit between the discharge outlet of the first compression stage 30a and the inlet to the second compression stage 30b whereby the partially compressed (intermediate pressure) refrigerant vapor (gas) passing from the discharge outlet of the first compression stage to the inlet to the second compression stage passes in heat exchange relationship with a flow of cooling media, such as, for example, but not limited to the cooling air flow generated by the gas cooler fan.

Therefore, it is intended that the present disclosure not be limited to the particular embodiment(s) disclosed as, but that the disclosure will include all embodiments falling within the scope of the appended claims.

We claim:

1. A refrigerant vapor compression system comprising:
a compression device for compressing a refrigerant vapor from a suction pressure to a discharge pressure, a refrigerant heat rejection heat exchanger and a refrigerant heat absorption heat exchanger arranged in serial refrigerant flow relationship in a transcritical cycle closed-loop primary refrigerant circuit, the refrigerant heat rejection heat exchanger functioning as a refrigerant gas cooler and the refrigerant heat absorption heat exchanger functioning as a refrigerant evaporator; and
a controller operatively associated with the refrigerant vapor compression system, the controller configured to control the discharge pressure to a desired set point discharge pressure to improve energy efficiency, wherein the controller determines the set point discharge pressure as a mathematical product of a compressor speed correction factor multiplied by a function of a refrigerant gas cooler outlet condition and an evaporator refrigerant condition.

2. The refrigerant vapor compression system as recited in claim 1 wherein the sensed evaporator outlet refrigerant condition comprises one of a sensed evaporator outlet refrigerant pressure and a sensed suction pressure.

3. The refrigerant vapor compression system as recited in claim 1 wherein the controller determines the set point discharge pressure using executable program instructions that execute in the controller to calculate the set point discharge pressure according to the function:

$$P_{DISopt} = (\text{compressor correction speed factor}) \times f(R_{GCout}, R_{EVAP}) \text{ wherein:}$$

$P_{DISopt}$ is the optimal set point discharge pressure,
$R_{GCout}$ is the gas cooler outlet refrigerant condition,
$R_{EVAP}$ is the evaporator refrigerant condition.

4. The refrigerant vapor compression system as recited in claim 1 wherein the compressor speed correction factor is a function of the operating speed of the compression device in revolutions per minute.

5. The refrigerant vapor compression system as recited in claim 4 wherein the compressor speed correction factor is a non-linear function of the operating speed of the compression device in revolutions per minute.

6. The refrigerant vapor compression system as recited in claim 4 wherein the compressor speed correction factor is a quadratic function of the operating speed of the compression device in revolutions per minute.

7. The refrigerant vapor compression system as recited in claim 1 further comprising:
a flash tank disposed in the primary refrigerant circuit in serial refrigerant flow relationship between the refrigerant heat rejection heat exchanger and the refrigerant heat absorption heat exchanger;
an economizer vapor line fluidly interconnecting the flash tank to an intermediate pressure stage of the compression device;
a high pressure expansion device disposed in the primary refrigerant circuit between the refrigerant heat rejection heat exchanger and the flash tank; and
an evaporator expansion device disposed in the primary refrigerant circuit between the flash tank and the refrigerant heat absorption heat exchanger.

8. The refrigerant vapor compression system as recited in claim 7 wherein the controller is further configured to adjust a degree of openness of the high pressure expansion device to control the discharge pressure to a set point discharge pressure that varies in real-time in response to selected operating parameters to improve energy efficiency.

9. The refrigerant vapor compression system as recited in claim 1 further comprising an unload circuit including an unload refrigerant line fluidly connecting an intermediate pressure stage of the compression device to a low-pressure side of the primary refrigerant circuit and an unload flow control device disposed in the unload refrigerant line, the unload flow control device selectively positionable in an open position wherein refrigerant may flow through the unload refrigerant line and a closed position wherein refrigerant is blocked from flowing through the unload refrigerant line.

10. The refrigerant vapor compression system as recited in claim 9 wherein the controller is further configured to control discharge pressure when the unload flow control device is in the open position by varying a duty cycle or a speed of a fan operatively associated with the refrigerant heat rejection heat exchanger.

11. The refrigerant vapor compression system as recited in claim 1 wherein the refrigerant vapor compression system comprises a refrigeration system of a transport refrigeration unit for supplying refrigerated air to a cargo storage box and employing carbon dioxide as the refrigerant.

12. A method of optimizing energy efficiency of a refrigeration system of a transport refrigeration unit for supplying refrigerated air to a cargo storage box for storing product for transportation under perishable or frozen conditions, comprising:
    compressing a refrigerant in a compression device to a discharge pressure in excess of a critical point for the refrigerant;
    passing the compressed refrigerant substantially at the discharge pressure through a refrigerant gas cooler;
    expanding the refrigerant discharged from the refrigerant gas cooler to an intermediate pressure less than the critical point of the refrigerant;
    passing the expanded refrigerant into a flash tank to separate into a refrigerant gas and a refrigerant liquid;
    further expanding at least a portion of the refrigerant liquid; passing the further expanded refrigerant through an evaporator heat exchanger in heat exchange relationship with air to be supplied to the cargo storage box;
    operating the refrigerant vapor compression system in one of a capacity mode and an unload mode; and
    when operating in a capacity mode, controlling the discharge pressure to a desired set point discharge pressure to improve energy efficiency, the set point discharge pressure determined as a mathematical product of a compressor speed factor multiplied by a function of a refrigerant gas cooler outlet condition and an evaporator refrigerant condition.

13. The method as recited in claim 12 wherein the evaporator refrigerant condition comprises one of a sensed evaporator outlet refrigerant pressure and a sensed suction pressure.

14. The method as recited in claim 12 further comprising calculating the set point discharge pressure using executable program instructions that execute in a controller to calculate according to the function:

$P_{DISout} = $(compressor correction speed factor)$\times f(R_{GCout}, R_{EVAP})$ wherein:

$P_{DISout}$ is the optimal set point discharge pressure,
$R_{GCout}$ is the gas cooler outlet refrigerant condition,
$R_{EVAP}$ is the evaporator refrigerant saturation condition.

15. The method as recited in claim 12 further comprising calculating the compressor speed correction factor as a function of the operating speed of the compression device in revolutions per minute.

16. The method as recited in claim 12 wherein the compressor speed correction factor is a non-linear function of the operating speed of the compression device in revolutions per minute.

17. The method as recited in claim 12 wherein the compressor speed correction factor is a quadratic function of the operating speed of the compression device in revolutions per minute.

18. The method as recited in claim 12 wherein;
    expanding the refrigerant discharged from the refrigerant vapor cooler to an intermediate pressure less than the critical point of the refrigerant comprises passing the refrigerant discharged from the refrigerant gas cooler through a high pressure expansion device; and
    controlling the discharge pressure to a desired set point discharge pressure to improve energy efficiency further includes adjusting a degree of openness through the high pressure expansion device in response to a differential between a sensed discharge pressure and the set point discharge pressure.

19. The method as recited in claim 12 further comprising:
    when operating in low capacity mode, controlling the discharge pressure to maintain the refrigeration vapor compression system operating to a continuous running mode at minimal cooling capacity.

20. The method of claim 19 wherein controlling the discharge pressure further comprises varying a duty cycle or a speed of a fan operatively associated with the gas cooler heat exchanger.

* * * * *